Sept. 22, 1953
J. C. WARD
2,653,035
TORQUE ROD ASSEMBLY FOR SPRING SUSPENSION
Filed Nov. 9, 1951
3 Sheets-Sheet 1
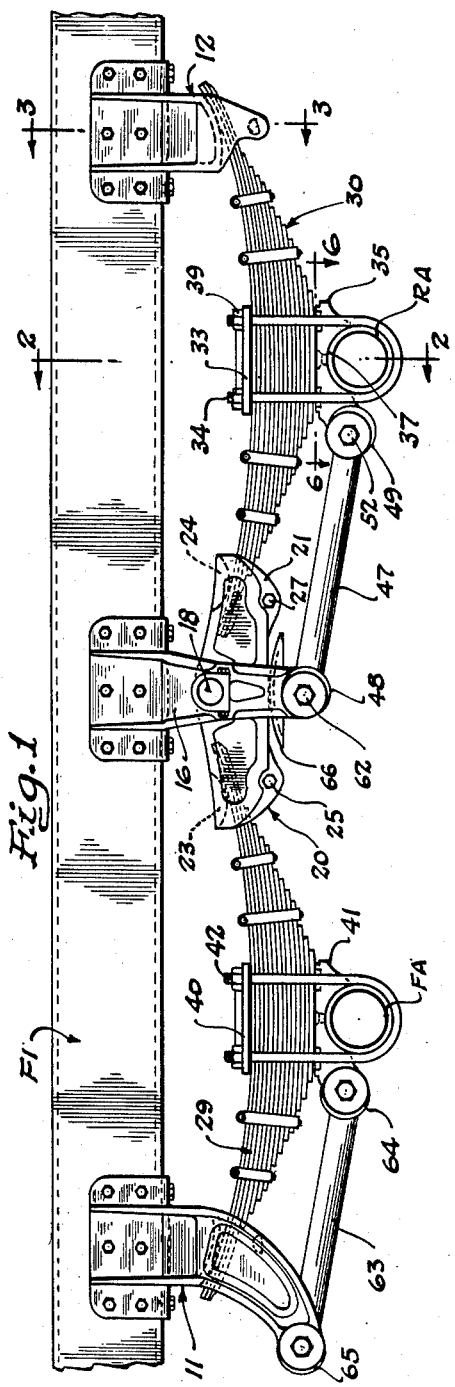
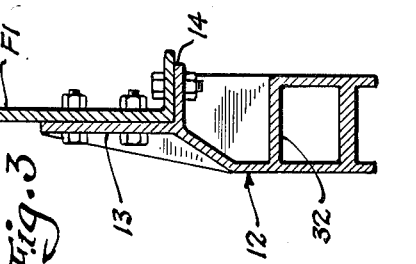
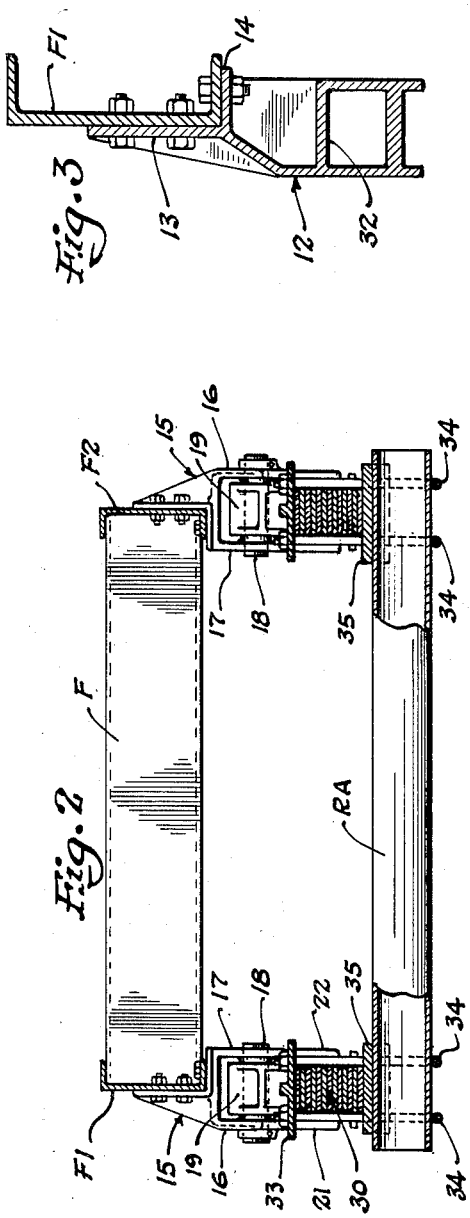
INVENTOR.
James C. Ward
BY
Wallace and Cannon
ATTORNEYS Sept. 22, 1953         J. C. WARD                2,653,035
              TORQUE ROD ASSEMBLY FOR SPRING SUSPENSION
Filed Nov. 9, 1951                              3 Sheets-Sheet 2
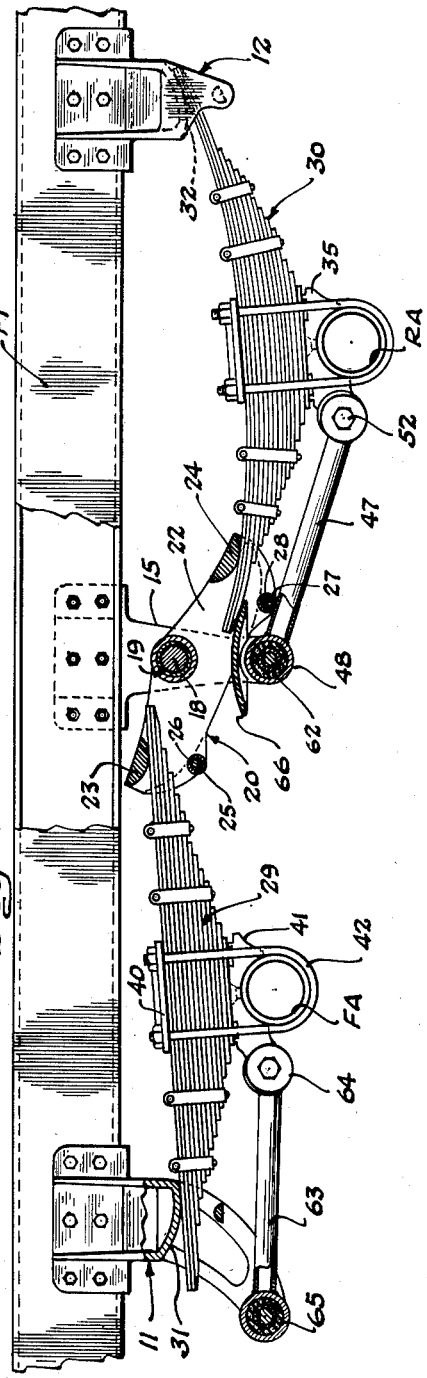
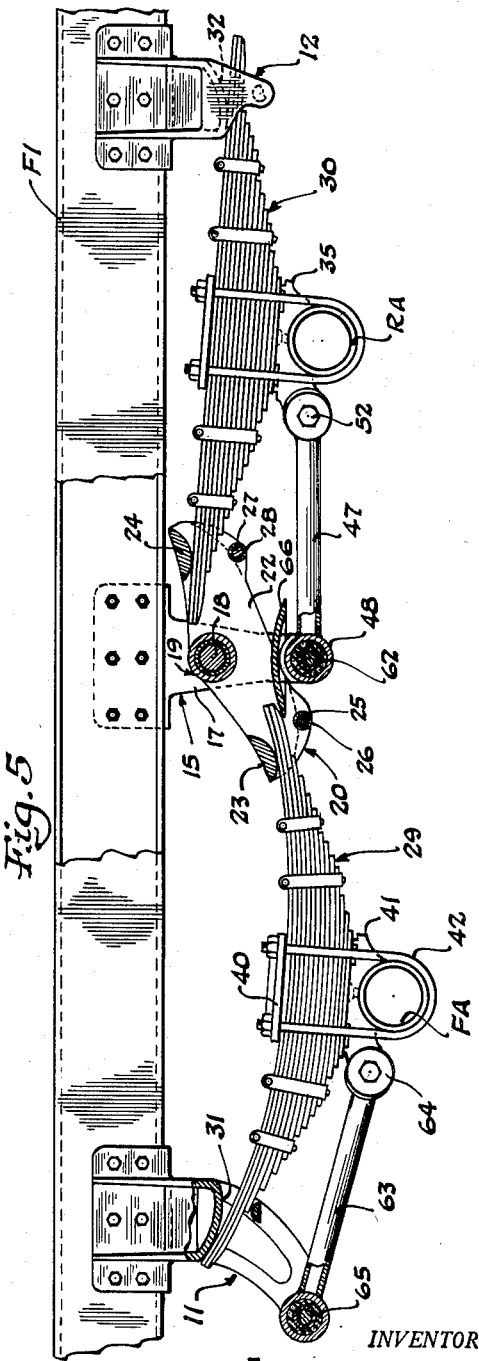
INVENTOR.
James C. Ward
BY
Wallace and Cannon
ATTORNEYS Sept. 22, 1953 J. C. WARD 2,653,035
TORQUE ROD ASSEMBLY FOR SPRING SUSPENSION
Filed Nov. 9, 1951 3 Sheets-Sheet 3
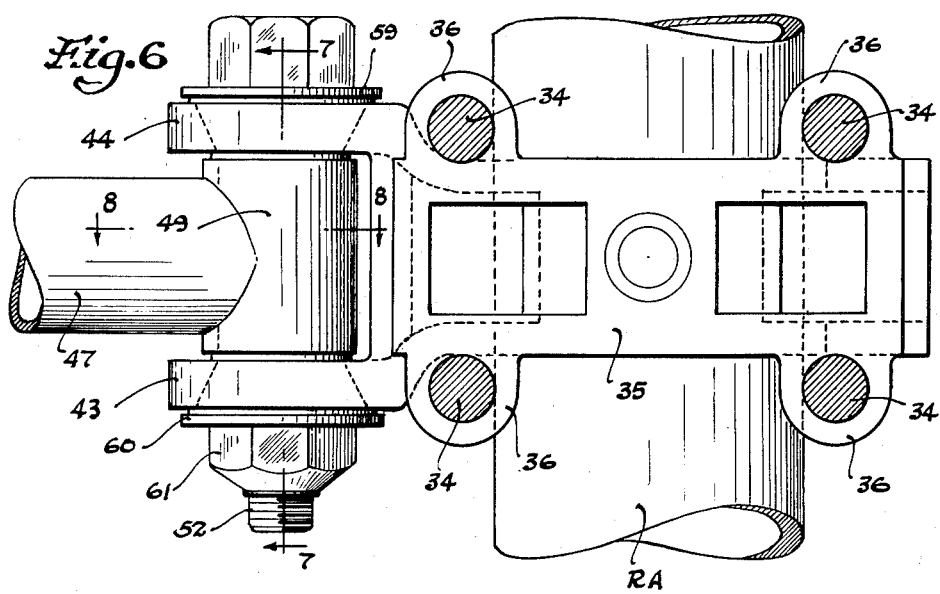
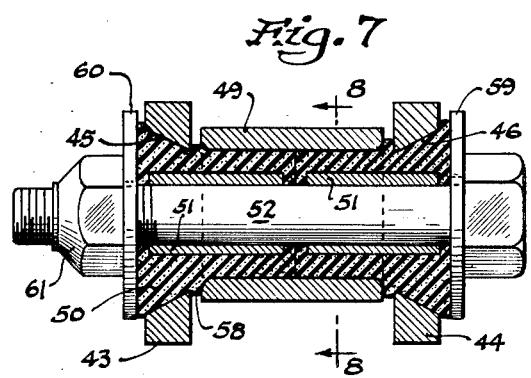
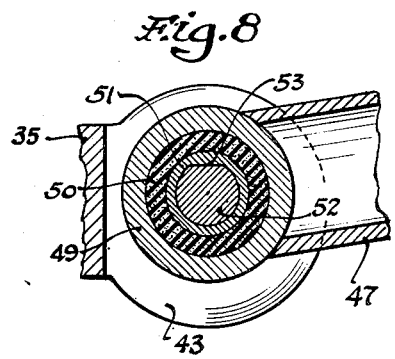
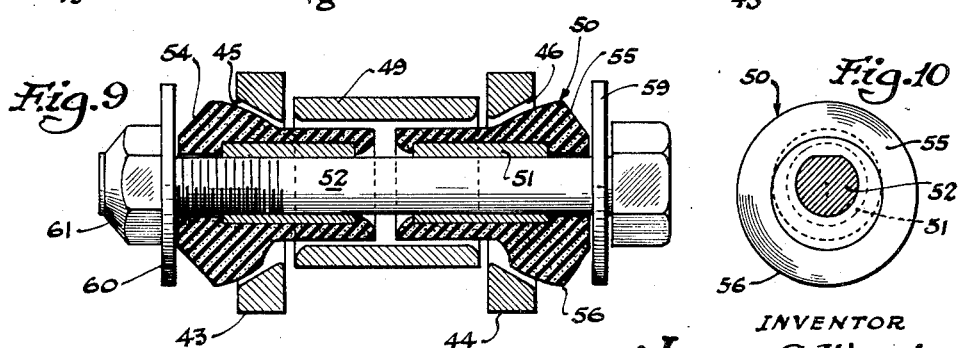
INVENTOR
James C. Ward
BY Wallace and Cannon
ATTORNEYS

Patented Sept. 22, 1953

2,653,035

UNITED STATES PATENT OFFICE 2,653,035

TORQUE ROD ASSEMBLY FOR SPRING SUSPENSION

James C. Ward, Springfield, Mo., assignor to Reynolds Manufacturing Company, Springfield, Mo., a corporation of Missouri Application November 9, 1951, Serial No. 255,699

10 Claims. (Cl. 280—104.5)

This invention relates to spring suspensions particularly of the kind adapted for use on heavy duty trucks and trailers that are commonly employed in cross country transportation.

Heavy duty trucks and trailers of this character are usually equipped with two axles at the rear end thereof, and in instances where such axles are independently suspended from the frame of the vehicle, it often happens that an impact impressed on one axle is of such nature that it causes the axle to bear the entire load that should normally be distributed between the two axles. Therefore, it has been proposed heretofore to afford a spring suspension for two such axles that will be of such nature that the stress incident to an impact impressed on one axle may be distributed between the axles and such arrangements have commonly been referred to as tandem spring suspensions, and the present invention particularly has to do with improvements in such suspensions.

In tandem spring suspensions of the prior art certain operative parts have been connected together in such a way that there was metal to metal contact between certain of the parts, and by reason of water, road grime and the like that collects on the parts in the course of use of the suspensions, such parts have become frozen together making separation thereof quite difficult when repair of the tandem was to be effected, and it is therefore an object of the present invention to connect operative elements of a spring suspension of the aforesaid character in such a way that metal to metal engagement will be avoided and thereby freezing of the parts and the like will be avoided.

It is essential in a suspension of the aforesaid character that the two axles be arranged in parallel relation one with the other and also that the longitudinal extent of the axles be normal to the line of travel of the vehicle. In order that this may be realized, it is necessary to arrange the axles so that the longitudinal position of each axle may be varied with respect to the other so that adjustments may be effected to bring the axles into the aforesaid parallel and normal relation, and yet another object of this invention is to enable this to be effected in an expeditious and economical manner.

More specific objects of this invention are to interpose a rubber bushing intermediate operative parts of a suspension of the aforesaid character so as to thereby prevent metal to metal contact between the parts; to equip such bushings with eccentric portions mountable in members to be movable relative thereto whereby movement of the bushing relative to the member in which it is mounted will cause a variation in the relationship between the bushing and the member; and to utilize an arrangement of this character to effect the aforesaid adjustment of the axles to bring the same into aforesaid parallel and normal relation.

It is sometimes necessary that heavy trucks and trailers be transported from one place to another in an unloaded condition and it is advantageous to arrange spring suspensions of the aforesaid character in such a way that when a relatively light load is impressed thereon, as when the vehicle is unloaded, the spring suspension will readily yield, and to enable this to be realized is another object of this invention, and objects ancillary to the foregoing are to employ leaf springs in a spring suspension of the aforesaid character that are so arranged that certain leaves of the spring embody greater resiliency than that of the spring of the whole; and to so relate such portions of the spring to the vehicle as to enable these portions to carry the load impressed on the vehicle especially during the unloaded condition thereof.

In spring suspensions of the aforesaid character, it is common to provide an equalizer between adjacent ends of the springs of the suspension and such an equalizer is used in the present invention, and further objects of this invention are to limit canting movement of such an equalizer so as to prevent the same from moving into engagement with the frame of the vehicle on which it is mounted; to afford a stop against which the end portions of the springs may move when stresses incident to an impact on one axle are being distributed between the axles and to so arrange the spring and stop as to insure against impaling of the spring on the stop.

Yet further objects of this invention are to engage the ends of the springs in a suspension of the aforesaid character with arcuate surfaces of such nature that when the spring is deflected from the normal convex configuration thereof toward a straight line the engagement of the spring with the support therefor will move progressively inwardly of the spring so as to thereby decrease the effective lengths of the spring and increase the flexure rate of the spring; and to afford an arrangement of the aforesaid character that is of such nature that the effective length and the flexure rate of the spring is adjusted in response to the load impressed thereon.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a preferred form of my novel apparatus showing the same mounted on the frame of an automotive vehicle;

Fig. 2 is a transverse sectional view in which certain parts are broken away and which is taken substantially on the line 2—2 on Fig. 1;

Fig. 3 is a vertical sectional view taken substantially on line 3—3 on Fig. 1;

Figs. 4 and 5 are side elevational views in which certain parts are broken away and which respectively illustrate different operative positions that may be assumed by my apparatus;

Fig. 6 is a detail view drawn to an enlarged scale and taken substantially on the line 6—6 on Fig. 1;

Fig. 7 is a sectional detail view taken substantially on the line 7—7 on Fig. 6;

Fig. 8 is a transverse sectional view taken substantially on the line 8—8 in Fig. 7;

Fig. 9 is a view similar to Fig. 8 but showing the parts in released positions; and Fig. 10 is an end elevational view of the bushing employed in the arrangement illustrated in detail in Figs. 6, 7 and 8 and wherein the bolt on which the bushing is mounted is shown in cross section.

In the accompanying drawings I have shown my novel apparatus in association with the frame of an automotive vehicle which, as shown in Fig. 2, comprises two side members F1 and F2 arranged in spaced apart relation. My apparatus is adapted to support a front axle FA and a rear axle RA from the frame in such a way as to yieldingly suspend these axles from the frame so that shocks and the like encountered in the course of movement of the vehicle over a roadway will be dissipated.

My novel apparatus includes substantially similar structures that are respectively mounted on the side members of the frames F1 and F2 and hereinafter the one of these structures that is associated with the side frame F1 is described in detail since the structure mounted on the side member F2 is similar to that which is described.

As shown, my apparatus comprises a front hanger bracket 11 and a rear hanger bracket 12. As best shown in Fig. 3 the rear hanger bracket 12 comprises an upstanding plate 13 that is adapted to rest against the outer face of the side member F1 of the frame on which it is to be secured, and this hanger also includes a seat 14 that engages the lower face of the side frame member. When the plate and seat are located, as aforesaid, the bracket 12 is bolted or otherwise suitably secured to the side member F1 of the frame. The front hanger bracket 11 is similarly arranged to enable it to be secured to the side member F1 of the frame on which it is to be mounted. While I have shown the front and rear brackets as including elements respectively engageable with the outer and lower faces of the side member F1 of the frame, it will be understood that under certain circumstances a side plate on each hanger bracket may be rested against the outer face of a side member of the frame to be suitably secured thereto as by welding. The type of mounting of the front and rear brackets will depend upon the nature of the frame of the vehicle with which my apparatus is to be associated, and any manner of mounting which insures tight connection of the brackets to the side member of the frame is suitable.

My apparatus also includes a center bracket 15 which is arranged to be secured to the side member F1 of the frame midway between the front and rear brackets 11 and 12 in any suitable manner such as that described hereinabove with reference to the front and rear hanger brackets. The center bracket 15 includes depending spaced apart arms 16 and 17, Figs. 1, 2, 4 and 5. A stub shaft 18 is extended between the arms 16 and 17 in position to be slightly spaced below the lower edge of the side member F1 of the frame and a bearing 19 of suitable construction is disposed about the shaft 18 to afford a pivotal support for an equalizer generally indicated by 20. The equalizer 20 comprises side frame members 21 and 22, Figs. 1, 2, 4 and 5 which are interconnected adjacent to their front ends by a bearing plate 23 that extends therebetween, and a similar bearing plate 24 extends between these side frame members adjacent the rear ends thereof.

A bolt 25 extends between the side frame members 21 and 22 below the bearing plate 23 and the portion of this bolt disposed between the side frame members is surrounded by a sleeve 26. Another bolt 27 extends between the side frame members 21 and 22 below the bearing plate 24 and this bolt is also surrounded by a sleeve as 28. The equalizer 20 has adjacent ends of leaf springs 29 and 30 extended thereinto in such a way that the rear end of the spring 29 is disposed between the bearing plate 23 and the sleeve 26 while the front end of the spring 30 is disposed between the bearing plate 24 and the sleeve 28. Normally these ends of the springs respectively bear against the bearing plates 23 and 24 but in the course of operation of my apparatus these ends of the springs may respectively move into engagement with the sleeves 26 and 28 which, in such circumstances, will be effective to prevent displacement of these ends of the springs from the equalizer 20.

As best shown in Figs. 4 and 5 the front hanger bracket 11 includes a downwardly directed arcuate bearing surface 31 against which the forward end of the spring 29 is adapted to bear. The configuration of this arcuate surface is such that when my apparatus is at rest the forward end of the spring 29 bears against the arcuate surface 31 adjacent to the forward end thereof. Moreover, the arcuate configuration is such that as the spring 29 is deflected from the normal position thereof shown in Fig. 1 toward the relatively extreme deflected position shown in Fig. 4, the spring will progressively bear against portions of the arcuate surface 31 disposed inwardly from the forward end thereof. This arrangement enables a gradual shortening of the effective length of the spring and also has the effect of gradually increasing the flexure rate of the spring as the force impressed thereon increases and thereby relatively uniform functioning of the spring is insured.

An arcuate surface 32 corresponding to the arcuate surface 31 is provided in the rear hanger bracket 12 and is arranged correspondingly to the arcuate surface 31 except that the end of the spring 30 that is adapted to engage therewith in the normal position engages the arcuate surface 32 near the rear end thereof and progressively engages forwardly disposed portions of the arcuate surface 32 in the course of flexure of the spring 30 from the normal position thereof shown in Fig. 1 toward the relatively extreme deflected position thereof shown in Fig. 5. Thus the arcuate surface 32 functions with respect to the spring 30 in the same manner as that in which the arcuate surface 31 functions with respect to the spring 29.

The lower surfaces of the bearing plates 23 and 24 respectively embody arcuate configurations that are of a configuration like that of the surfaces 31 and 32 described hereinabove. Thus as the spring 29 is deflected from the normal position thereof shown in Fig. 1 toward the extreme deflected position thereof shown in Fig. 4, the end of the spring 29 respectively engages progressively inwardly disposed portions of the arcuate lower surface of the bearing plate 23. Correspondingly, when the spring 30 is deflected from the normal position thereof shown in Fig. 1 toward the extreme deflected position thereof shown in Fig. 5, the end of this spring adapted to cooperate with the lower arcuate surface of the bearing plate 24 progressively engages rearwardly disposed portions of this arcuate surface. This progressive engagement of the ends of the springs 29 and 30 respectively with the bearing plates 23 and 24 also has the effect of shortening the effective lengths of the springs and thereby increasing the flexure rate thereof so as to thereby also contribute to uniform functioning of the springs 29 and 30.

My novel apparatus is particularly adapted for use in association with heavy duty trucks or heavy duty trailers and the above described adjustments of the effective length of the springs 29 and 30 not only insures uniform functioning of the springs upon deflection thereof when the vehicle is traversing a rough surface but also the effective length of the springs is automatically adjusted in response to the load to be carried by the vehicle. Thus, in Fig. 1 I illustrated my novel apparatus with the parts thereof in the positions occupied thereby in the unloaded condition of the vehicle with which my apparatus is associated. However, as the vehicle is loaded and the weight increases, the springs deflected downwardly and the effective length of the springs 29 and 30 is altered in the manner described hereinabove so that the effective length of the springs, and therefore the flexure rate thereof, are automatically adjusted and correspond to the degree of weight to be supported by the springs.

Corresponding ends of the axles FA and RA are adapted to be respectively supported from the medial portions of the springs 29 and 30. Thus referring to Fig. 2 it will be seen that a plate 33 is disposed above the top leaf of the spring 30. The lower surface of this plate may be recessed to receive the upper leaf of the spring in such a way that the edges of this leaf are embraced by the side edges of the recess so afforded. Spaced apart U-bolts as 34 have the limbs thereof extended upwardly past medial portions of the sides of the leaves of the spring 30 desirably in contact therewith so as to be effective to prevent lateral displacement of the leaves of the spring. An axle seat 35, Figs. 1, 2 and 6 is engaged with the lower leaf of the spring 30 and this seat is equipped with ears as 36, Fig. 6, through which the limb portions of the U-bolts 34 are extended. The axle seat 35 includes a downwardly faced arcuate surface 37, Fig. 1, that is adapted to embrace the upper portion of the axle RA and by referring to Fig. 1 it will be seen that the bight of each U-bolt as 34 embraces the axle RA so as to force the same into engagement with the arcuate seat 37. The U-bolts as 34 are passed through the plate 33 and nuts as 39 are fitted onto the threaded free ends of the U-bolts and are effective to tightly clamp the various elements associated with these bolts in tight relation one with the other.

A plate 40 and an axle seat 41 and U-bolts as 42 are associated with the spring 29 and the front axle FA in the same manner as that described hereinabove with respect to the spring 30 and the rear axle RA. It will thus be seen that the axles FA and RA of the vehicle are firmly connected to my novel apparatus respectively midway in the extent of the front and rear springs 29 and 30.

The spring seat 35 includes two forwardly extending arms 43 and 44, Figs. 6 and 7. The arms 43 and 44 respectively have openings 45 and 46, Fig. 7, formed therein, and as shown in Fig. 7, the walls of these openings are inclined so that the openings are larger at the outwardly disposed ends thereof than at the inwardly disposed ends thereof whereby to afford seats adapted to be engaged by a bushing as will be explained presently. A torque arm 47, Fig. 1, is provided which desirably is tubular in form and which has transversely extending sleeves as 48 and 49 welded or otherwise secured thereto at opposite ends thereof. As best shown in Fig. 7, the sleeve 49 is adapted to be disposed between the arms 43 and 44 and this sleeve is adjustably connected to these arms. To this end a rubber bushing 50 is mounted in the sleeve 49. This bushing is adapted to closely embrace the stem of a bolt 52 which, as best shown in Fig. 8, has a flattened surface 53 formed thereon, the sleeve 51 including a complementary portion whereby the sleeve, and consequently the bushing 50, are non-rotatably connected to the bolt 52. As best shown in Figs. 7, 9 and 10, the bushing 50 includes substantially conical end portions 54 and 55 which are eccentric to the medial extent of the bushing that is disposed about the sleeve 51. The sleeve 51 and the bushing 50 are divided medially in the extent thereof and the end portions of the bushing at this division of the bushing are desirably enlarged, as indicated at 56. The surfaces of the substantially conical end portions 54 and 55 are adapted to respectively seat in the openings 45 and 46 when the sleeve 49 is to be connected to the arms 43 and 44.

When the sleeve 49 is to be connected to the arms 43 and 44, the bushing 50 is extended through the bore of the sleeve 49. The stem of the bolt 52 is then passed through the sleeve 51 to extend beyond the substantially conical end portion 54 of the bushing 50 which is adapted to seat in the opening 45 in the arm 43, the substantially conical end portion 55 at this time being oriented to cooperate with the conical opening 46 in the arm 44. A washer 59 is interposed between the head of the bolt 52 and the substantially conical end portion 55 and another washer 60 is disposed at the outer end of the substantially conical end portion 54. A self-locking nut 61 is passed onto the threaded free end portion of the stem of the bolt 52 outwardly of the washer 60. Thereafter the nut 61 is run inwardly on the threaded portion of the bolt 52 and in so doing the rubber bushing 50 is compressed so as to assume the position thereof illustrated in Fig. 7. In so doing the end portions 54 and 55 are respectively firmly seated in the openings 45 and 46 and the enlarged end portions as 56 are forced into tight engagement with the stem portion of the bolt 52 whereby the sleeve 49 is tightly connected to the arms 43 and 44, this tight connection being assured by reason of the compression of the rubber bushing 50 resulting from tightening of the nut 61. Moreover, the tightening of nut 61 forces portions of the bushing 50 into the spaces between the respective ends of the sleeve 49 and the adjacent faces of the arms 43 and 44 whereby rings as 58 are formed on the periphery of the bushing 50.

Resort to a rubber bushing as 50 is not only advantageous in assuring a tight interconnection but also because rubber is disposed between metallic surfaces that are disposed in adjacent relation one to the other. Thus if the sleeve 51 was directly engaged with the openings 45 and 46 and also with the sleeve 49, since these parts are exposed to water and road grime when in use, there might be a tendency toward freezing of these parts one with the other. The rubber bushing, however, so separates the various elements that this and kindred objectionable conditions are avoided.

The sleeve 48 at the other end of the torque arm 47 has a rubber bushing similar to the rubber bushing 50 associated therewith and also is adapted to have a bolt 62 corresponding to the bolt 52 associated therewith. The sleeve 48 is disposed between the lower portions of the arms 15 and 16 of the center bracket. These depending arms have conical openings formed therein that correspond to the conical openings 45 and 46. Thus when a nut is tightened on the bolt 62 the sleeve 48 is tightly connected between the depending arms of the center bracket.

Another torque arm 63, like the torque arm 47, is provided which has sleeves 64 and 65 provided at the respective ends thereof. The front spring seat 41 has arms formed thereon corresponding to the arms 43 and 44 and the sleeve 65 is secured between these arms in the manner shown in Fig. 7 and described hereinabove with reference to the sleeve 49. The sleeve 65 is disposed between depending arms of the front bracket 11 and is connected thereto in the manner described hereinabove with reference to the sleeve 49 and as shown in Fig. 7.

The adjustability afforded by the eccentric end portions on the bushings as 50 enables adjustment of the torque arms to be effected so as to bring the axles FA and RA into parallel relation one with the other and also into normal relation with the line of travel of the vehicle with which my apparatus is associated. Thus by loosening the nut as 61 from a particular one of the bolts as 52 the compression of the associated bushing 50 is relieved and this is effected to such an extent that the bushing 50 may be rotated in the openings as 45 and 46 on which it is mounted. By reason of the eccentricity of the end portions of such a bushing, such movement thereof in the openings in which these portions are mounted has the effect of increasing or decreasing the effective length of the associated torque arm and in this way, for example, the front axle FA may be moved toward or away from the rear axle RA so as to thereby establish the desired relationship between the axles and the line of travel of the vehicle.

As will be explained presently, the equalizer 20 rocks in the course of operation of my apparatus, and in view of this it is important to insure that in the course of such rocking movement the respective end portions of the equalizer do not move into engagement with the lower portion of the frame on which my apparatus is mounted. To this end a stop seat 66 is mounted between the depending arms 15 and 16 of the center bracket 16 in a position immediately above that whereat the torque arm 47 is connected to this bracket. This stop seat comes into use in an extreme instance such as that illustrated in Fig. 4 where the wheels carried by the front axle FA have encountered an obstruction which has forced the axle FA upwardly. This tends to straighten the spring 29 and causes the respective end portions of the spring to move over the arcuate surfaces afforded by the members 23 and 31. In the course of movement of the adjacent end portions of the spring 29 over the arcuate lower surface of the member 23 the equalizer 20 is pivoted from the normal position thereof shown in Fig. 1 into the canted position shown in Fig. 4. In the course of movement of the equalizer 20 into the canted position, the arcuate surface on the lower wall of the member 24 is effective on the adjacent end of the spring 30 so as to force this end of the spring downwardly. Such downward movement of this end of the spring 30 is limited by engagement of this end of the spring with a stop seat 66 as shown in Fig. 4 and the interruption of such downward movement also interrupts movement of the equalizer 24 so that it is prevented from coming into engagement with the frame of the vehicle. The canting movement imparted to the equalizer 20 in an instance where the front axle FA is raised as aforesaid has the effect of dissipating the shock incident to such raising through both the springs 29 and 30 since the equalizer 20 is effective to transfer a portion of the shock from the spring 29 to the spring 30 so that the equalizer, in effect, equalizes the stress impressed on the respective springs. So to do expedites dissipation of the stresses attendant to the impressed shock and causes the vehicle on the frame F to move in a relatively horizontal plane so that stresses incidental to such shocks are not impressed on the vehicle. The aforesaid canting of the equalizer as 20 also results in insuring that the impressed load will be borne substantially equal by the respective axles FA and RA. Thus when the axle as FA is forced upwardly as aforesaid the normal effect would be for this axle to pick up the entire impressed load. However, by reason of the canting movement of the equalizer 20 and the transfer of the attendant stresses to the spring 30, the impressed load tends to remain equally impressed upon the respective axles.

In Fig. 5 I have illustrated the positions assumed by various elements of my apparatus in an instance where the rear axle RA is forced upwardly, and in this instance the equalizer as 20 is effective to distribute the attendant stress between the springs 30 and 29, and this also has the effect of substantially equally distributing the impressed load between the axles RA and FA.

Normally leaf springs embody a convex configuration and the length of the leaves progressively decreases in the direction of the convex configuration thereof. Thus in normal spring construction the inward leaf in the convex configuration of the spring 29 would be somewhat longer than the immediately adjacent leaf and this leaf, in turn, would be somewhat longer than the leaf immediately adjacent thereto and outwardly thereof. By referring to the drawings it will be noted that most of the leaves of the springs 29 and 30 are arranged in this conventional manner. However, by reason of the fact that the end portions of the springs 29 and 30 may be moved into engagement with the stop seat 66, it is advantageous to alter the conventional arrangement of the springs. Thus it has been found that in those instances where the length of the leaves of the springs progressively decreases and the end portion of such a spring moves into engagement with the stop 66 it is possible for the end of a leaf of a spring to be impaled on the end of the stop 66 whereby the spring is prevented from returning to its normal position. In order to avoid this, I arrange all leaves of the spring that are likely to come into engagement with the stop seat 66 to be of at least substantially equal length. Moreover, I impart an arcuate configuration to the face of the stop to be engaged by the springs which also contributes to preventing a leaf of the spring from being impaled on the stop. In further pursuance of the foregoing in the present instance I have arranged the inwardmost leaf of the spring and the leaf immediately adjacent thereto so as to be of equal length and also so as to embody end surfaces which are disposed to be congruent one with the other. In many instances the leaf adjacent to these two leaves may also be arranged in this manner, but in the present instance I have found it advantageous to taper the free end of this leaf so that a bevelled surface is afforded in the end thereof which at its outer end merges with the congruent faces of the other two leaves. In the present instance it is only necessary to arrange three leaves of the spring in this manner because the dimensions of the various elements are such that these are the only leaves of the springs that might come into contact with the stop seat 66. It will be appreciated that in other arrangements additional leaves might be of such length as to be likely to impale on a stop seat as 66 and in such instances the end portions of such leaves will be extended in the manner described hereinabove.

The extension of certain leaves of the springs in the manner just described is not only advantageous in that it prevents such springs from impaling on the stop seat but this arrangement embodies the further advantage of imparting resiliency to the end portions of the springs that is greater than the resiliency of the spring as a whole. As a result of this a quite flexible support is afforded especially in those instances where but a light load is impressed upon the springs, a condition which is found to be quite advantageous.

It will be manifest from the foregoing description that I have provided a spring suspension that enables the hereinafter and above set forth and kindred objects of this invention to be realized, and while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, a torque arm extended between one of the axle suspensions and the first bracket, and means for adjustably connecting said torque arm to said one axle suspension and the first bracket, the last-named means comprising an expandable eccentric bushing mounted for rotation in at least a selected one of the said first bracket and the said one axle suspension, a bearing sleeve at the end of said torque arm corresponding to said eccentric bushing, said bushing being expandably fitted into said bearing sleeve, and means to hold the bushing in an expanded relation against the bearing sleeve.

2. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, each of said springs being of convex configuration and having parallel leaves therein of which a majority are of successively increasing length inwardly of the convex configuration of the spring, the end portions of said springs that are respectively engageable with said rockable member and said brackets being afforded by the inwardmost of the leaves of the spring, at least the two inwardmost leaves being of substantially equal length and the leaf adjacent to such leaves having at least selected of the end portions of beveled configurations in portions thereof aligned with said portions of equal length whereby each such end portion embodies greater resiliency than that of the spring as a whole.

3. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, a stop seat on said first bracket below said rockable member in position to be engaged by one or the other of the adjacent end portions of the springs upon rocking of said rockable member in one direction or the other into one or the other of the extreme positions thereof to thereupon limit further movement of said member in such direction, the end portions of the leaves of the springs so engageable with said stop seat being of substantially equal length so as to thereby prevent the end portions of such leaves from impaling on said stop seat, and the outwardmost of the leaves of said spring engageable with said stop seat having a free end portion of beveled configuration to insure smooth sliding movement thereof over said stop seat.

4. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, a torque arm extended between one of the axle suspensions and the first bracket, means for adjustably connecting said torque arm to said one axle suspension and the first bracket, another torque arm extended between the other of said axle suspensions and the second bracket, and means for adjustably connecting said other torque arm to said other axle suspension and the second bracket, each of said means for thus adjustably connecting each torque arm including a resilient eccentric bushing at a selected one of the bracket and axle suspensions corresponding to the torque arm, said bushing having enlarged ends, a bearing sleeve at the end of the torque arm corresponding to said bushing, with the enlarged ends of the bushing projecting beyond the opposite ends of the bearing sleeve, and means for compressing said enlarged ends of the bushing against said opposite ends of the bearing sleeve.

5. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, a torque arm extended between one of the axle suspensions and the first bracket, another torque arm extended between the other of said axle suspensions and the second bracket, means for adjustably connecting at least selected of the ends of the torque arms respectively to mounting means on the axle suspensions and on the first and second brackets which include a bearing sleeve at such a selected end of a torque arm, a resilient eccentric bushing disposed for rotation relative to the torque arm between and relative to the adjacent mounting means and such bearing sleeve, said bushing having tapered ends projecting outwardly from either opposite end of said bearing sleeve, and means for holding said tapered ends of the bushing under compression to compress the bushing against said bearing sleeve and thereby secure each such mounting means, bushing and bearing sleeve in selected adjusted relation with each other.

6. In a spring suspension of the kind described that includes two leaf springs arranged in spaced apart and aligned relation, an axle suspension mounted at the medial part of each spring, a first bracket, a rockable member mounted on the first bracket and disposed to be engaged by the adjacent ends of said springs, a second bracket engaged by the remote end of one spring, a third bracket engaged by the remote end of the other spring, a torque arm extended between one of the axle suspensions and the first bracket, another torque arm extended between the other of said axle suspensions and the second bracket, and means for adjustably connecting at least selected of the ends of the torque arms respectively between spaced-apart arms on the axle suspensions and on the first and second brackets which include a bearing sleeve at such a selected end of a torque arm, an eccentric bushing of resilient material interposed between said spaced-apart arms and fitted into said bearing sleeve and effective to separate such spaced-apart arm and bearing sleeve from each other, and means for securing each such bushing and bearing sleeve in selected adjusted relation with each other with said bushing under compression in and between the spaced-apart arms and the bearing sleeve, the last named means including tapered openings in said spaced-apart arms in which said bushings are mounted, enlarged tapered ends on said bushings with sections of said tapered ends being of a diameter larger than said openings and being extended through said openings, and means for drawing said tapered ends toward one another to compress said bushing in said tapered openings and against the outer side walls of said spaced apart arms.

7. In a spring suspension of the kind described that includes a leaf spring having an axle suspension mounted medially thereof and means at either end of the spring for supporting the spring in a suspended relation, a one-piece torque arm having at either end a connection to respective mounting means carried by one of said supporting means and said axle suspension respectively, at least one of said mounting means including a resilient eccentric bushing having at least one enlarged end and being rotatably supported relative to said torque arm, the end of said torque arm corresponding to said bushing having a bearing sleeve mounted on said bushing with the enlarged end of the latter projecting from the corresponding end of the bearing sleeve, said bearing sleeve being of less inside diameter than the diameter of said enlarged end, and means for bearing against said enlarged end of the bushing to compress the bushing against said bearing sleeve and thereby hold the torque arm in an adjusted relation made possible through predetermined rotation of said bushing.

8. In a spring suspension of the kind described that includes a leaf spring having an axle suspension mounted medially thereof and means at either end of the spring for supporting the spring in a suspended relation, a one-piece torque arm having at either end a connection to respective mounting means carried by one of said supporting means and said axle suspension respectively, at least one of said mounting means including a pair of relatively short spaced apart arms, a resilient eccentric bushing rotatably carried by said arms and having at least one enlarged end, the end of said torque arm corresponding to said bushing having a bearing sleeve mounted on said bushing with the enlarged end of the latter projecting from the corresponding end of the bearing sleeve, said bearing sleeve being of less inside diameter than the diameter of said enlarged end, and means for bearing against said enlarged end of the bushing to compress the bushing against said bearing sleeve and thereby hold the torque arm in an adjusted relation made possible through predetermined rotation of said bushing.

9. In a spring suspension of the kind described that includes a leaf spring having an axle suspension mounted medially thereof and means at either end of the spring for supporting the spring in a suspended relation, a one-piece torque arm having at either end a connection to respective mounting means carried by one of said supporting means and said axle suspension respectively, at least one of said mounting means including a pair of relatively short spaced apart arms, a resilient eccentric bushing rotatably carried by said arms and having enlarged ends disposed outwardly of said arms so as to be compressible against the outer sides of said arms, the end of said torque arm corresponding to said bushing having a bearing sleeve mounted on the bushing between said arms, and means holding said enlarged ends under compression against said outer sides of said arms to compress said bushing against said bearing sleeve and thereby hold said torque arm in an adjusted position.

10. In a spring suspension of the kind described that includes a leaf spring having an axle suspension mounted medially thereon and means adjacent either end of the spring for supporting the same in a suspended relation, a one-piece torque arm having at either end a connection to respective mounting means carried by one of said supporting means and said axle suspension respectively, at least one of said mounting means including a pair of relatively short spaced apart bearing arms having tapered bearing openings therein, a bearing sleeve at the end of the torque arm corresponding to said bearing arms, and a resilient expandable eccentric bushing expandably fitted into said bearing sleeve and the openings in said spaced apart arms so that the bushing may be rotated against and relative to the bearing faces of the spaced apart arms and the bearing sleeve to thereby adjust the effective length of said torque arm, the end of the bushing corresponding to each of said bearing openings in said bearing arms being enlarged and extended through such bearing opening to the outer side thereof, and means to compress and hold compressed said projecting and enlarged end of the bushing within the corresponding bearing opening and the bearing sleeve to thereby lock up the adjusted length of the torque arm.

JAMES C. WARD.

References Cited in the file of this patent
UNITED STATES PATENTS

| Number | Name | Date |
|---|---|---|
| 1,812,876 | Hufferd | July 7, 1936 |
| 2,338,478 | Wulf | Jan. 4, 1944 |
| 2,502,744 | Parker | Apr. 4, 1950 |
| 2,577,322 | Frazier | Dec. 4, 1951 |